(12) United States Patent
Kang

(10) Patent No.: US 12,407,963 B2
(45) Date of Patent: Sep. 2, 2025

(54) OIL FIELD MONITORING SERVICE PROVIDING METHOD

(71) Applicant: ULALA LAB. INC, Anyang-si (KR)

(72) Inventor: Hak Ju Kang, Gunpo-si (KR)

(73) Assignee: ULALA LAB. INC, Anyang-si (KR)

( * ) Notice: Subject to any disclaimer, the term of this patent is extended or adjusted under 35 U.S.C. 154(b) by 0 days.

(21) Appl. No.: 18/408,718

(22) Filed: Jan. 10, 2024

(65) Prior Publication Data
US 2024/0244353 A1 Jul. 18, 2024

(30) Foreign Application Priority Data

Jan. 17, 2023 (KR) .................. 10-2023-0006542

(51) Int. Cl.
*H04Q 9/00* (2006.01)
*E21B 41/00* (2006.01)
*H04L 67/12* (2022.01)

(52) U.S. Cl.
CPC .............. *H04Q 9/00* (2013.01); *E21B 41/00* (2013.01); *H04L 67/12* (2013.01); *H04Q 2209/40* (2013.01)

(58) Field of Classification Search
CPC .. H04Q 9/00; H04Q 2209/00; H04Q 2209/10; H04Q 2209/40; H04Q 2209/70; H04Q 2209/80; H04Q 2209/84; H04L 67/12; E21B 41/00
See application file for complete search history.

(56) References Cited

U.S. PATENT DOCUMENTS

| | | | |
|---|---|---|---|
| 9,104,986 B2 * | 8/2015 | Kerr | H04L 12/66 |
| 11,711,675 B2 * | 7/2023 | Stout | H04W 4/38 |
| | | | 166/250.15 |
| 2011/0258293 A1 * | 10/2011 | Kim | H04L 67/10 |
| | | | 709/219 |

FOREIGN PATENT DOCUMENTS

| | | | | |
|---|---|---|---|---|
| KR | 20100072467 A | * | 7/2010 | ............... E02F 9/20 |
| KR | 1020100072467 A | | 7/2010 | |
| KR | 1020100074536 A | | 7/2010 | |
| KR | 1020200134082 A | | 12/2020 | |

\* cited by examiner

*Primary Examiner* — Franklin D Balseca
(74) *Attorney, Agent, or Firm* — Dinsmore & Shohl LLP; Yongsok Choi, Esq.

(57) ABSTRACT

An oil field monitoring service providing method includes collecting, by a plurality of sensors installed in an oil drilling apparatus, data generated as the oil drilling apparatus operates and providing the data to a transmission module, transmitting the collected data from the transmission module to a server, and providing status information of the oil drilling apparatus to a user terminal based on the data received by the server, wherein the transmitting of the collected data includes determining, by the transmission module, a transmission cycle according to a type of data to be transmitted and whether there is an increase in communication network usage fee used by the transmission module within a preset period, and compressing the data according to the transmission cycle determined by the transmission module and transmitting the compressed data to the server.

14 Claims, 10 Drawing Sheets

FIG. 8

| Dashboard ▶ |
| Alarm ▶ |
| Facility management ▶ |
| Data Analysis ▶ |
| Statistics ▶ |
| Report ▶ |

503

| Well 1 29°34N 96°32W / Lease 2 | | CTZ 12:30:34 |
|---|---|---|
| Operation Status | | Please check driving motor |
| Production Start Date | Down Time | Flow Meter (Oil/Water production) |
| 2019. 08. 01 | 8 h / July, 2022 | 22 bbl/min |
| Motor Storke Chemical ESP/Jet Pressure Oil/Water Pump Pump | | Site production Temperature HSE Issues |

| Well 2 29°34N 96°32W / Lease 2 | | CTZ 12:30:34 |
|---|---|---|
| Operation Status | | |
| Production Start Date | Down Time | Flow Meter (Oil/Water production) |
| 2019. 08. 01 | 8 h / July, 2022 | 22 bbl/min |
| Motor Storke Chemical ESP/Jet Pressure Oil/Water Pump Pump | | Site production Temperature HSE Issues |

| Well 3 29°34N 96°32W / Lease 2 | | CTZ 12:30:34 |
|---|---|---|
| Operation Status | | HSE Issues |
| Production Start Date | Down Time | Flow Meter (Oil/Water production) |
| 2019. 08. 01 | 8 h / July, 2022 | 22 bbl/min |
| Motor Storke Chemical ESP/Jet Pressure Oil/Water Pump Pump | | Site production Temperature HSE Issues |

| Well 4 29°34N 96°32W / Lease 2 | | CTZ 12:30:34 |
|---|---|---|
| Operation Status | | Please check Temperature |
| Production Start Date | Down Time | Flow Meter (Oil/Water production) |
| 2019. 08. 01 | 8 h / July, 2022 | 22 bbl/min |
| Motor Storke Chemical ESP/Jet Pressure Oil/Water Pump Pump | | Site production Temperature HSE Issues |

| Well 5 29°34N 96°32W / Lease 2 | | CTZ 12:30:34 |
|---|---|---|
| Operation Status | | |
| Production Start Date | Down Time | Flow Meter (Oil/Water production) |
| 2019. 08. 01 | 8 h / July, 2022 | 22 bbl/min |

| Well 6 29°34N 96°32W / Lease 2 | | CTZ 12:30:34 |
|---|---|---|
| Operation Status | | |
| Production Start Date | Down Time | Flow Meter (Oil/Water production) |
| 2019. 08. 01 | 8 h / July, 2022 | 22 bbl/min |

OIL FIELD MONITORING SERVICE PROVIDING METHOD

CROSS-REFERENCE TO RELATED APPLICATION

This application is based on and claims priority under 35 U.S.C. § 119 to Korean Patent Application No. 10-2023-0006542, filed on Jan. 17, 2023, in the Korean Intellectual Property Office, the disclosure of which is incorporated by reference herein in its entirety.

BACKGROUND

The present disclosure relates to an oil field monitoring service providing method and oil field monitoring service providing system, and more particularly, to an oil field monitoring service providing method and oil field monitoring service providing system that monitor oil fields based on digital oil field (DOF) technology and provide an oil field monitoring status and analysis results through user terminals.

A wave of digital transformation or digitalization, which began several years ago with the fourth industrial revolution, is being applied to all industrial fields without being limited to specific industrial fields, and the pace is also increasing faster than expected.

In particular, the oil development, exploration, and production industry which is a highly technology-intensive industry, is also accelerating a digitalization strategy called a digital oil field (DOF).

A long-term oil market downturn that began with the plunge in oil prices in 2014 provided a strong motivation, to the oil industry, that the oil industry could not survive unless the oil industry evolved more efficiently, and many oil development companies including a major oil company are attempting digital transformation to reduce costs and increase production efficiency.

However, there are too many oil fields to count in the world, and even in North America which is a major oil producing country, there are about 1.17 million oil fields, and the majority of oil fields are not operated efficiently.

SUMMARY

The present disclosure is intended to solve the problems described above, and an object of the present disclosure is to provide an oil field monitoring service and system.

In addition, another object of the present disclosure is to analyze data monitored in real time and provide the analyzed data through various user interfaces (UIs) of a user terminal to reduce costs required for resource development and production to increase economic feasibility and to support a stable management.

Objects to be achieved by the present disclosure are not limited to the objects described above, and other objects not described above may be clearly understood from the descriptions below.

According to an aspect of the present disclosure, an oil field monitoring service providing method includes collecting, by a plurality of sensors installed in an oil drilling apparatus, data generated as the oil drilling apparatus operates and providing the data to a transmission module, transmitting the collected data from the transmission module to a server, and providing status information of the oil drilling apparatus to a user terminal based on the data received by the server, wherein the transmitting of the collected data includes determining, by the transmission module, a transmission cycle according to a type of data to be transmitted and whether there is an increase in communication network usage fee used by the transmission module within a preset period, and compressing the data according to the transmission cycle determined by the transmission module and transmitting the compressed data to the server.

Also, the transmission module may include a first transmission unit configured to receive the data in real time from the plurality of sensors respectively installed in respective components of the oil drilling apparatus, set a transmission cycle for each piece of data, and transmit data compressed by a second transmission unit to the server, and the second transmission unit configured to receive the data transmitted from the first transmission unit to the server and compresses data collected during a period corresponding to the transmission cycle.

Also, the first transmission unit may classify a plurality of pieces of received data, calculate an average value of the classified data, and provide the average value to the server at different cycles according to a type of the classified data and whether there is an increase in communication network usage fee within the preset period.

Also, in the collecting of the data, the plurality of sensors may include a plurality of different types of sensors, be respectively installed in a pump device, a motor device, an oil storage device, and an oil transfer device included in the oil drilling apparatus, collect different types of data, and provide the different types of data to the transmission module.

Also, the transmitting of the collected data further may include calculating, by the server, a communication network usage fee required within the preset period based on an amount of data received by the server and a number of times of reception of the data received from the transmission module in a process of transmitting the data from the transmission module to the server via a base station of a telecommunication company, and transmitting a signal indicating expansion of the transmission cycle to the transmission module when the calculated communication network usage fee is more than a preset threshold.

Also, in the transmitting of the collected data, communication between the plurality of sensors and the transmission module may be performed through a local area network without using a base station.

Also, the transmitting of the collected data further may include adjusting, by the transmission module, a transmission cycle for each piece of data after receiving the signal from the server.

Also, in the adjusting of the transmission cycle, the transmission module may set differently the transmission cycle depending on positions in which the plurality of sensors are installed.

Also, in the adjusting of the transmission cycle, a transmission cycle of data collected from a pump device and a motor device included in the oil drilling apparatus may be less than a transmission cycle of data collected from an oil storage device and an oil transfer device.

Also, in the adjusting of the transmission cycle, the plurality of sensors may include different types of sensors including at least two of a pressure sensor, a current sensor, a voltage sensor, a temperature sensor, a vibration sensor, and a sound detection sensor, and the transmission module may set differently the transmission cycle depending on the type of data collected from the plurality of sensors.

Also, in the providing of the status information, an oil field monitoring user interface (UI) may provide the status information of the oil drilling apparatus as a number and an identifier for each preset category and may include an oil field status UI configured to display an oil field identification number, a current temperature, a stroke count, and an oil storage amount of a tank on each of at least one oil drilling apparatus, an alarm list UI configured to display whether there is abnormality in a pump device, a motor device, an oil storage device, and an oil transfer device included in the oil drilling apparatus during the preset period or a period received from the user terminal, and a degree of the abnormality of the pump device, the motor device, the oil storage device, and the oil transfer device on each of the at least one oil drilling apparatus, through identifiers distinguished by color, and a weather UI configured to provide weather information in a location of the oil field where a corresponding oil drilling apparatus is installed to each of the at least one oil drilling apparatus.

Also, the oil field monitoring UI may further include a dashboard UI, the dashboard UI may display, by the server, a plurality of oil drilling apparatuses currently being monitored with preset section information and a flag on a map application indicating locations of the plurality of oil drilling apparatuses and provide the map application to the oil drilling apparatus which receives a selection input through the user terminal among the plurality of oil drilling apparatuses, and the flag may provide whether there is abnormality in the pump device, the motor device, the oil storage device, and the oil transfer device included in the oil drilling apparatus and the degree of abnormality together with the identifier distinguished by color.

Also, the dashboard UI may provide a status summary card for each of the plurality of oil drilling apparatuses located in a corresponding section when the preset section information is selected and input by the user terminal, and the status summary card may display an oil field identification number, a monitoring start date, an average operation time, and an average production as numbers, and may display abnormality for each of a motor operation, a stroke count, a chemical pump, an ESP/Jet pump, pressure, an oil/water mixture, temperature, and other issues as a distinguishable identifier and color.

According to another aspect of the present disclosure, an oil field monitoring service providing system includes a plurality of sensors installed in an oil drilling apparatus to collect data generated as the oil drilling apparatus operates and to provide the data to a transmission module, a transmission module configured to determine a transmission cycle according to whether there is an increase in communication network usage fee used by the transmission module within a preset period and a type of data to be transmitted, and configured to compress data according to the determined transmission cycle and transmit the compressed data to a server, and a server including a memory that stores a program for performing an oil field monitoring service providing method and a processor that executes the program and configured to provide status information of the oil drilling apparatus to a user terminal based on the data received from the transmission module.

BRIEF DESCRIPTION OF THE DRAWINGS

Embodiments of the inventive concept will be more clearly understood from the following detailed description taken in conjunction with the accompanying drawings in which:

FIG. 8 is an example view of a status summary card according to an embodiment of the present disclosure;

DETAILED DESCRIPTION OF THE EMBODIMENTS

Figure 1:
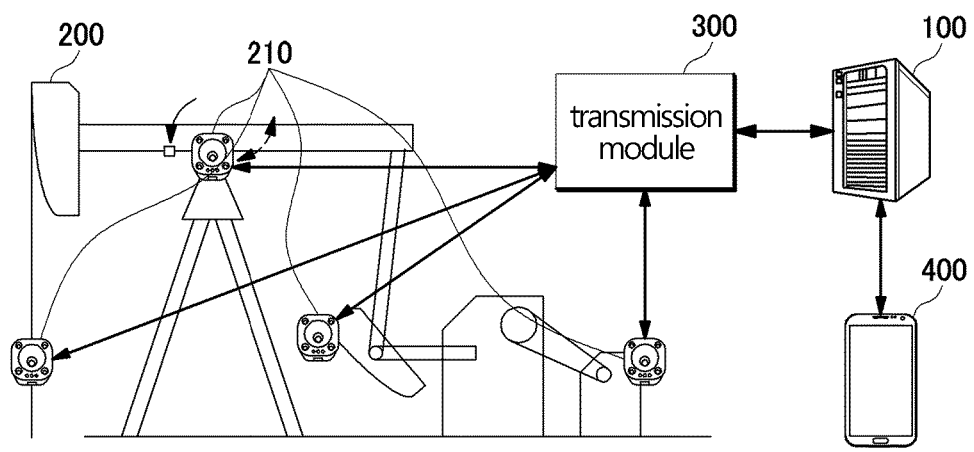
FIG. 1 is a structural diagram of an oil field monitoring service providing system according to an embodiment of the present disclosure.

Hereinafter, embodiments of the present disclosure will be described in detail with reference to the accompanying drawings such that those skilled in the art in which the present disclosure belongs may easily practice the present disclosure. However, the present disclosure may be implemented in many different forms and is not limited to the embodiments described herein. In addition, in order to clearly describe the present disclosure, parts irrelevant to the description are omitted in the drawings, and similar reference numerals are attached to similar parts throughout the specification.

When it is described that a portion is "connected" to another portion throughout the specification, this includes not only a case where the portion is "directly connected" to another portion but also a case where the portion is "electrically connected" to another portion with another component therebetween. In addition, when it is described that a portion "includes" a certain component, this means that the portion may further include another component without excluding another component unless otherwise stated.

In the present disclosure, a "portion" includes a unit realized by hardware, a unit realized by software, and a unit realized by using both. In addition, one unit may be realized by using two or more pieces of hardware, and two or more units may be realized by using one piece of hardware. Meanwhile, a "~ portion" is not limited to software or hardware, and a "~ portion" may be configured to be included in an addressable storage medium or may be configured to reproduce one or more processors. Therefore, in one example, "~ portion" refers to components, such as software components, object-oriented software components, class components, and task components, and includes processes, functions, properties, and procedures, subroutines, segments of program code, drivers, firmware, microcode, circuits, data, databases, data structures, tables, arrays, and variables. The functions provided within the components and "portions" may be combined into a smaller number of components and "portions" or may be further separated into additional components and "portions". Additionally, components and "portions" may be implemented to regenerate one or more central processing units (CPUs) included in a device or security multimedia card.

A "terminal" to be described below may be implemented by a computer or portable terminal that may be connected to a server or another terminal through a network. Here, a computer may include, for example, a laptop computer, a desktop computer, virtual reality (VR) head mounted display (HMD) (for example, HTC VIVE, Oculus Rift, GearVR, DayDream, PSVR, or so on), or so on in which a web browser is stored. Here, the VR HMD include an HMD for a personal computer (PC) (for example, HTC VIVE, Oculus Rift, FOVE, Deepon, or so on), a mobile HMD (for example, GearVR, DayDream, Storm Magic, Google Cardboard, or so on), a console HMD (PSVR), an independently implemented Stand Alone model (for example, Deepon, PICO, or so on), and so on. A mobile terminal is, for example, a wireless communication device that guarantees portability and mobility and may include not only a smartphone, a tablet personal computers (PC), or a wearable device, but also various devices equipped with communication modules of Bluetooth (Bluetooth low energy (BLE)), near field communication (NFC), radio frequency identification (RFID), ultrasonic, infrared, WiFi, LiFi, or so on. In addition, a "network" refers to a connection structure capable of exchanging information between nodes, such as a terminal and a server and includes a local area network (LAN), a wide area network (WAN), the Internet (WWW: World Wide Web), a wired and wireless data communications network, a telephone network, a wired and wireless television communication network, and so on. For example, the wireless data communication network includes third generation (3G), fourth generation (4G), fifth generation (5G), third generation partnership project (3GPP), long term evolution (LTE), world interoperability for microwave access (WIMAX), Wi-Fi, Bluetooth communication, infrared communication, ultrasonic communication, visible light communication (VLC), LiFi, and so on but are not limited thereto.

The present disclosure relates to an oil field monitoring service providing method and oil field monitoring service providing system which monitor oil fields in real time through predetermined devices, analyze the monitored data, and provide the analyzed data through various user interfaces (UIs) of user terminals, and thus, costs required for resource development and production may be reduced to increase economic feasibility, a stable management may be supported, and costs required during data transmission and reception may also be reduced by providing a data-based production improvement solution to an oil field and an oil drilling apparatus having low production efficiency, and automatically determining a data compression and transmission cycle according to the importance of data.

First, an oil field monitoring service providing system according to an embodiment of the present disclosure will be described with reference to FIG. 1.

The oil field monitoring service providing system according to the embodiment of the present disclosure includes a server 100, an oil drilling apparatus 200, a plurality of sensors 210, a transmission module 300, and a user terminal 400.

The oil drilling apparatus 200 includes at least one of a pump device, a motor device, an oil storage device, and an oil transfer device, and when a motor device operates, the underground oil is brought to the ground by the pump device, and the oil is transferred by the transfer device to be stored in an oil storage device, and the plurality of sensors 210 may be installed in each device.

The plurality of sensors 210 according to an embodiment of the present disclosure are composed of different types of sensors including at least two of a pressure sensor, a current sensor, a voltage sensor, a temperature sensor, a vibration sensor, and a sound detection sensor, and collect various types of data generated as oil is drilled by the oil drilling apparatus 200, and provide the data to the transmission module 300.

For this purpose, the transmission module 300 may be connected wired or wirelessly to the plurality of sensors 210 to communicate with each other and may set a transmission cycle differently depending on the type of data collected by the plurality of sensors 210.

According to the determined cycle, the transmission module 300 may transmit the collected data to the server 100, and the server 100 may perform an oil field monitoring operation based on the received data.

Figure 2:
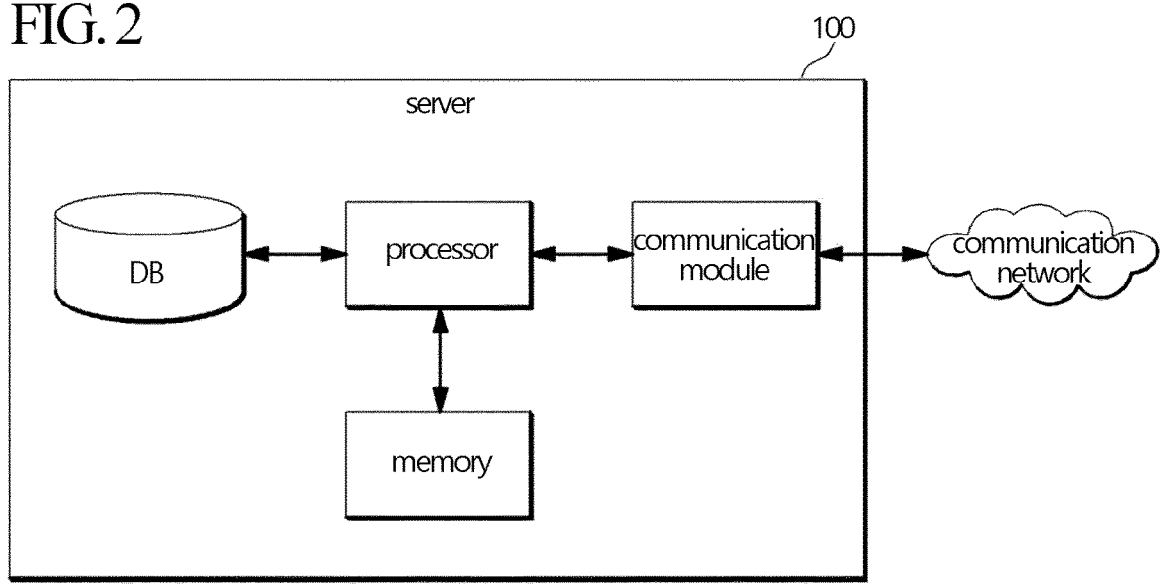
FIG. 2 is a block diagram illustrating an internal configuration of a server according to an embodiment of the present disclosure.

For this purpose, referring to FIG. 2, the server 100 according to an embodiment of the present disclosure may include a memory storing a program (or an application) for performing the oil field monitoring service providing method and a processor executing the program. Here, the processor may perform various functions according to the execution of the program stored in the memory.

In addition, a user terminal refers to a terminal owned by an owner or manager of a certain oil field or a terminal owned by an owner or manager of the oil drilling apparatus 200, and a program (or an application) that performs an oil field monitoring service providing method is stored in a smartphone, a tablet PC, a laptop computer, or a desktop computer.

Hereinafter, an oil filed monitoring service providing method according to an embodiment of the present disclosure will be described in detail.

First, the plurality of sensors 210 installed in the oil drilling apparatus 200 collect data generated as the oil drilling apparatus 200 operates and provide the data to the transmission module 300.

In this case, the plurality of sensors 210 are composed of various types of sensors and are respectively installed in a pump device, a motor device, an oil storage device, and an oil transfer device which are included in the oil drilling apparatus 200 to collect different data and to provide the data to the transmission module 300.

Figure 3:
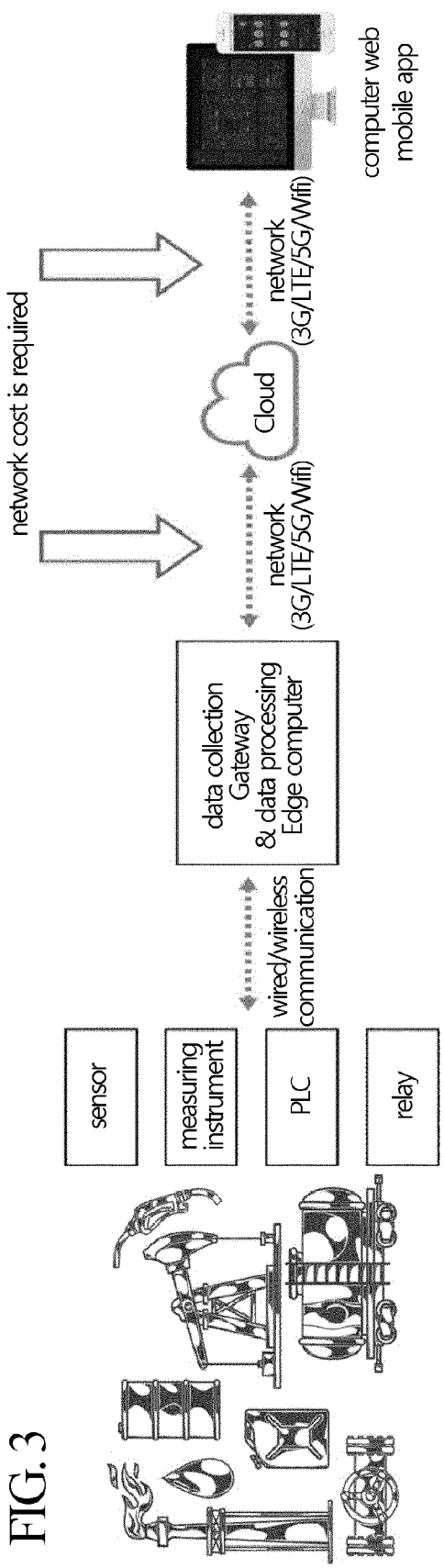
FIG. 3 is a conceptual diagram of an oil field monitoring service providing method according to an embodiment of the present disclosure.

Referring to FIG. 3, the oil field monitoring service providing method s according to an embodiment of the present disclosure may include a method of transmitting various types of data, which are generated at an oil drilling site, such as the oil drilling apparatus 200, the plurality of sensors 210, a measuring instrument, a programmable logic controller (PLC), and a relay device, to the transmission module 300 that serves as an edge computer through wired and wireless communication, and reducing network costs that occur when data is transmitted from the edge computer back to the server 100.

In this case, most network costs are communication network usage fees required by moving a large amount of data from the transmission module 300 to the server 100, and because all data occurring in real time is uploaded to the server 100 due to the nature of a monitoring field, network costs are required in the same manner no matter what communication method is used, such as third generation (3G), fourth generation (4G), fifth generation (5G), or Wi-Fi.

Therefore, the present disclosure provides a method of reducing a communication network usage fee compared to the known methods by uploading all received data to the server 100 at different cycles depending on the type of data or importance of the data, instead of uploading all received data in real time.

For this purpose, the transmission module 300 according to an embodiment of the present disclosure may determine a transmission cycle according to whether there is an increase in communication network usage fee used by the transmission module 300 within a preset period and the type of data to be transmitted.

In addition, data may be compressed according to the transmission cycle determined by the transmission module 300, and the compressed data may be transmitted to the server 100.

Determination of the transmission cycle and operations of data compression and transmission may be performed by one transmission module 300 or one transmission unit, but in a preferred embodiment of the present disclosure, the transmission module 300 may include a first transmission unit 310 and a second transmission unit 320 that respectively perform the above operations.

Figure 4:
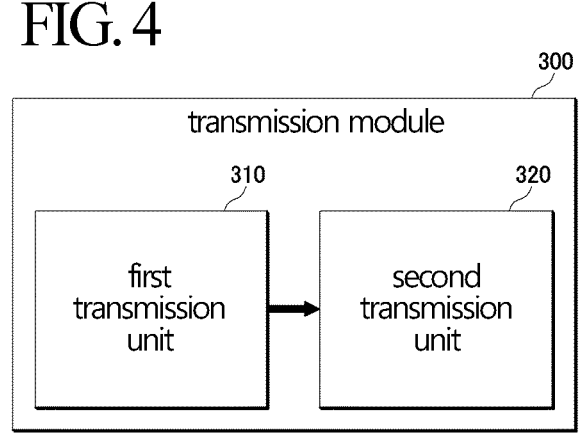
FIG. 4 is a block diagram of an internal configuration of a transmission module of an oil field monitoring service providing method according to an embodiment of the present disclosure.

Referring to FIG. 4, the transmission module 300 according to an embodiment of the present disclosure may include the first transmission unit 310 that receives data in real time from the plurality of sensors 210 installed in respective components constituting the oil drilling apparatus 200 and sets a transmission cycle for each data and transmits the data compressed by the second transmission unit 320 to the server 100, and the second transmission unit 320 that receives data to be transmitted to the server 100 from the first transmission unit 310 and compresses the data collected during a period corresponding to the transmission cycle.

In this case, the first transmission unit 310 according to an embodiment of the present disclosure may classify a plurality of data received from the plurality of sensors 210, calculate an average value of the classified data, and provide whether there is an increase in communication network usage fee within a preset period based on the average value to the server 100 at different cycles depending on types of the classified data.

In more detail, the server 100 to which the data received from the transmission module 300 is uploaded communicates with the transmission module 300 wired and wirelessly before the transmission module 300 transmits the data and calculates a communication network usage fee required within a preset period based on the amount of data received by the server 100 and the number of times of reception of the data received from the transmission module 300 during a process of transmitting data from the transmission module 300 to the server 100 via a base station of a telecommunication company.

That is, two cases are assumed in which the server 100 receives data of 100 MB once and receives data of 80 MB twice.

In the two cases, the total amount of data of 160 MB that is received by the server 100 twice is greater than the total amount of data of 100 MB that is received by the server 100 once, and in general, when transmitting large amounts of data at a time, a communication network usage fee is required more, and accordingly, the communication network usage fee required when transmitting data of 160 MB in twice may be less than the communication network usage fee required when transmitting the data of 100 MB once.

In this way, the amount of data received by the server 100 and the number of times of reception of data received from the transmission module 300 are not proportional to the communication network usage fee, and thus, the communication network usage fee may be reduced by flexibly setting a transmission cycle.

In another example, assuming that data of 200 MB is transmitted to the server 100, the communication network usage fee required when data of 100 MB is transmitted twice is greater than the communication network usage fee required when data of 50 MB is transmitted in four times, which corresponds to a case where a telecommunication company considers data of 60 MB or more as large amount of data.

Therefore, according to an embodiment of the present disclosure, the server 100 may calculate and determine the communication network usage fee by considering a telecommunication company's fee system in the same manner as described above, based on the amount of data received from the server 100 and the number of times of reception of data received from the transmission module 300.

When the communication network usage fee calculated in this way is more than a preset threshold, a signal indicating expansion of a transmission cycle may be transmitted to the transmission module 300, but in this case, the signal indicates expansion of the transmission cycle and does not indicate an increase in amount of data, which may also be used as a way to reduce a communication network usage fee.

According to an additional embodiment of the present disclosure, in a case where the communication network usage fee is calculated to be cheaper when the amount of data to be transmitted is large and a transmission cycle is set to be longer in the telecommunication company's fee system, the server 100 may also transmit a signal indicating an increase in amount of data to be transmitted to the transmission module 300 when the communication network usage fee is greater than a preset threshold.

In contrast to this, communication between the plurality of sensors 210 installed in the oil drilling apparatus 200 and the transmission module 300 is performed through a short-range communication network that does not use a base station, and is not reflected in calculation of the communication network usage fee.

In another embodiment of the present disclosure, when the plurality of sensors 210 transmit data to the transmission module 300 that is away more than a preset distance through a base station, costs required to transmit data between the plurality of sensors 210 and the transmission module 300 may also be included in calculating a communication network usage fee by using the server 100.

As described above, the transmission module 300 received a command signal from the server 100 actually receives a signal from the server 100 and then adjusts a transmission cycle for each data or the amount of data to be transmitted and transmits the data to the server 100.

In this case, the transmission module 300 may also set the transmission cycle and the amount of data to be transmitted to be different from each other depending on positions where the plurality of sensors 210 are attached.

In particular, the transmission cycle of data collected from a pump device and a motor device constituting the oil drilling apparatus 200 may be set to be less than a transmission cycle of data collected from an oil storage device and an oil transfer device.

In the oil drilling apparatus 200, the pump device and the motor device perform the most important operation of pumping oil from underground, and when the two devices are defective and normal operations thereof are not performed, productivity of an oil field in which the oil drilling apparatus 200 is installed is greatly affected.

Therefore, according to an embodiment of the present disclosure, a transmission cycle of the data collected from the pump device and motor device constituting the oil drilling apparatus 200, is set to be less than a transmission cycle of a transmission cycle of the data collected from the oil storage device and oil transfer device, and checked by the server 100 more frequently, and thus, the most important indicator of the productivity of an oil field may be accurately monitored.

Next, the server 100 provides status information of the oil drilling apparatus 200 to a user terminal based on the received data.

In this case, the server 100 may provide status information of the oil drilling apparatus 200 in numbers and identifiers for each preset category through an oil field monitoring UI 410, and the oil field monitoring UI 410 according to an embodiment of the present disclosure may be displayed on a user terminal by executing a program (or an application) that performs an oil field monitoring service providing method stored in the user terminal and the server 100.

Figure 5:
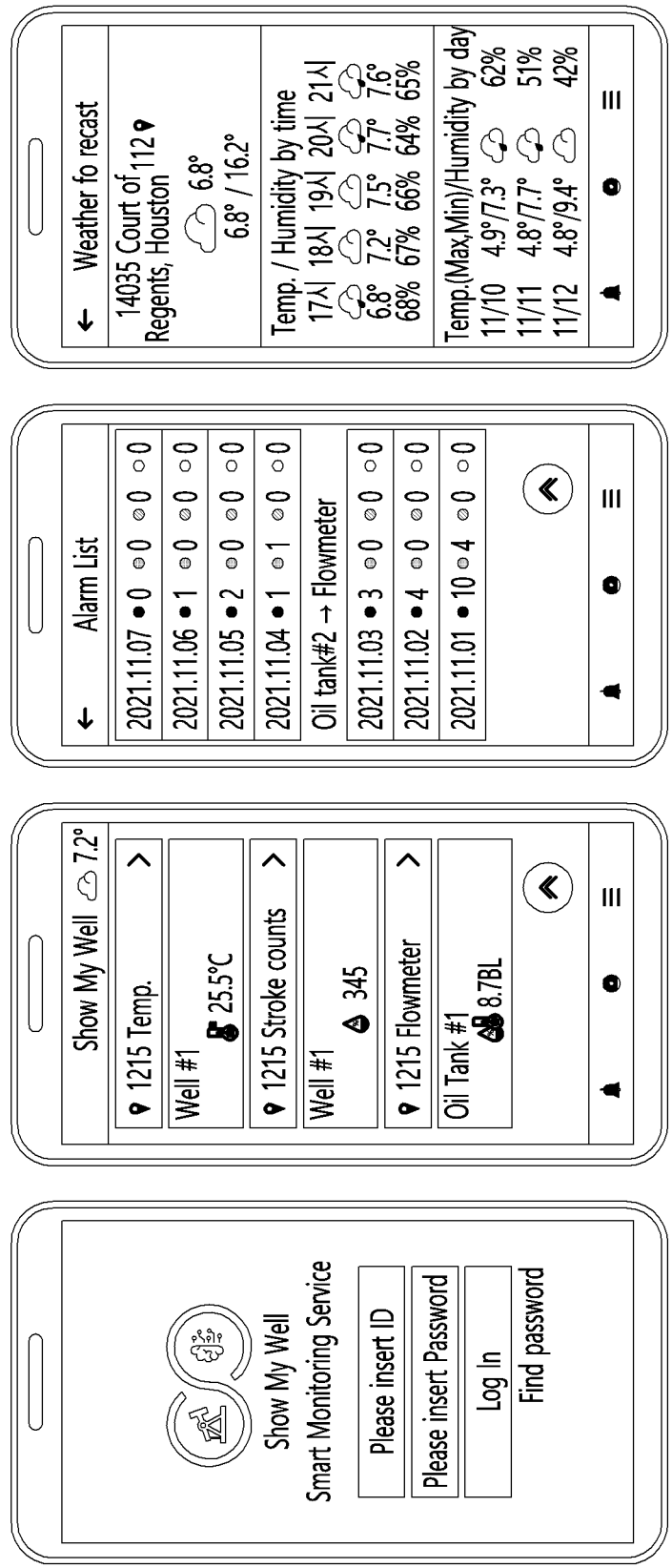
FIG. 5 illustrates example views of an oil field monitoring UI, an oil field status UI, an alarm list UI, and a weather UI displayed on a user terminal, according to an embodiment of the present disclosure.

As illustrated in FIG. 5, the oil field monitoring UI 410 according to an embodiment of the present disclosure may include an oil field status UI 411, an alarm list UI 412, and a weather UI 413.

The oil field status UI 411 may provide to and display on, at least one oil drilling apparatus 200, an identification number of an oil field where the oil drilling apparatus 200 is installed, a current temperature of the oil field, and a stroke count generated by a motor of the oil drilling apparatus 200, and an oil storage amount in an oil storage tank of the oil drilling apparatus 200.

The alarm list UI 412 may display on, at least one oil drilling apparatus 200, whether a pump device, a motor device, an oil storage device, and an oil transfer device included in the oil drilling apparatus 200 are abnormal and the degree of abnormality during a preset period or a period received from a user terminal, through a color-coded identifier.

In a preferred embodiment, the alarm list UI 412 of the present disclosure may be implemented by a method in which a color close to red indicates a high degree of abnormality and a color close to green indicates a low degree of abnormality, by using a circular identifier to determine whether there is an error for each device.

The weather UI 413 provides weather information on a location of an oil field where the oil drilling apparatus 200 is installed to at least one oil drilling apparatus 200, and due to the nature of oil fields widely distributed in regions with different climates around the world, it is obvious that weather information has to be provided.

For example, assuming that there are an oil field A located in a tropical climate region and an oil field B located in a cold climate region, even when temperatures of the oil drilling apparatuses 200 installed in respective oil fields are all 50 degrees, it should be interpreted that the temperature of the oil drilling apparatus 200 installed in the oil field in the region B where the weather is always cold is higher than indicated compared to an oil fields in the region A where the weather is always mild.

Figure 6:
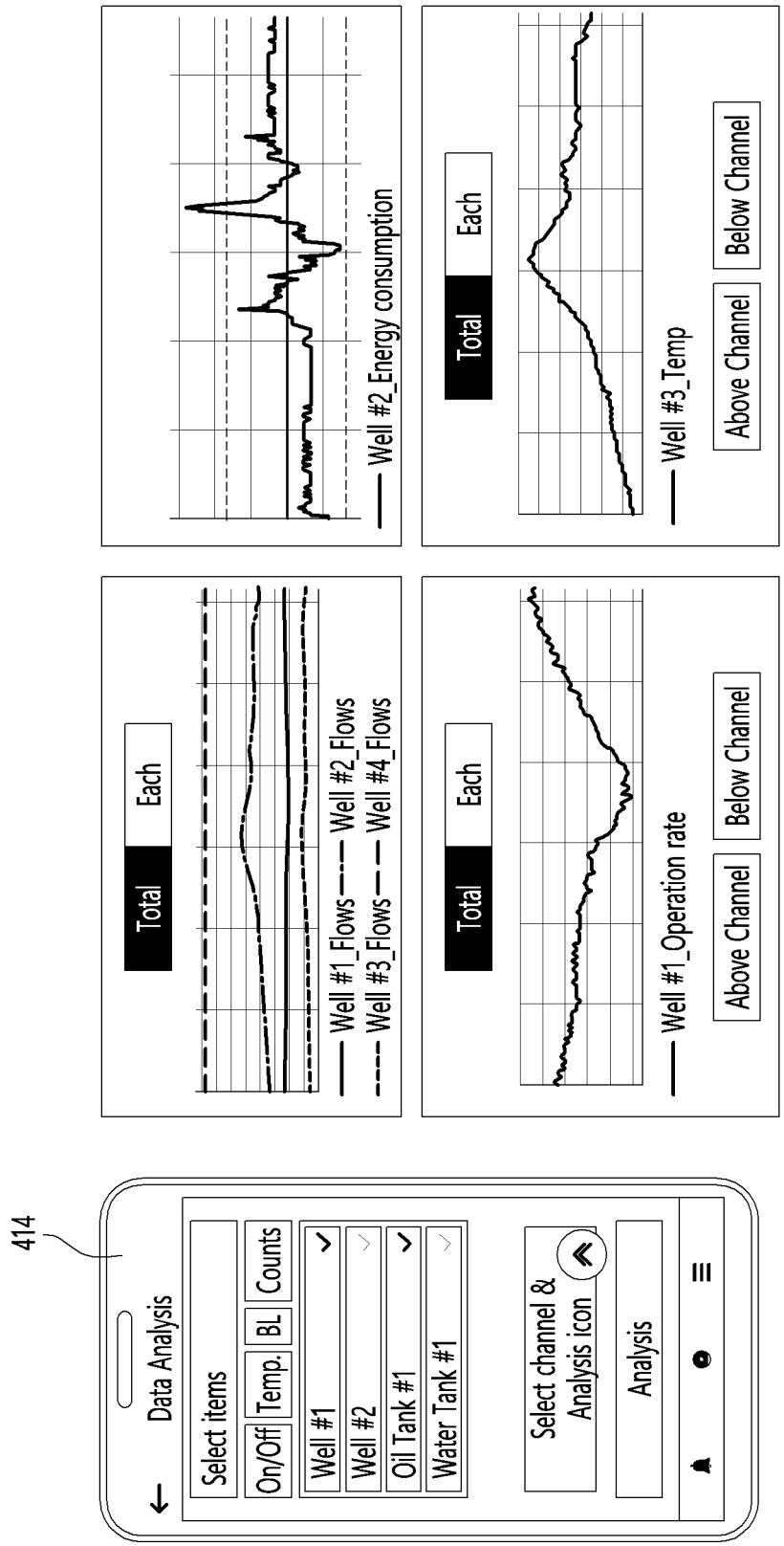
FIG. 6 illustrates example views of a statistics UI and a plurality of graphs provided through the statistics UI according to an embodiment of the present disclosure.

Also, referring to FIG. 6, a statistics UI 414 may be further provided, and the statistics UI 414 may display the data provided by the oil field status UI 411, the alarm list UI 412, and the weather UI 413 in the form of a graph.

As illustrated, when multiple oil fields are selected by the statistics UI 414 to display a production volume of each oil field, the production volume of the multiple oil fields may be displayed on one graph, and when one of the multiple oil fields is selected, an operation rate of the oil drilling apparatus 200 during a preset period of a relevant oil field or a period input to a user terminal, the power or thermal energy consumption of the oil drilling apparatus 200, and an average temperature of the oil drilling apparatus 200 may be displayed and provided in the form of a graph.

In addition, the oil field monitoring UI 410 may further include a dashboard UI 415 to provide information on the multiple oil fields with greater visibility.

Figure 7:
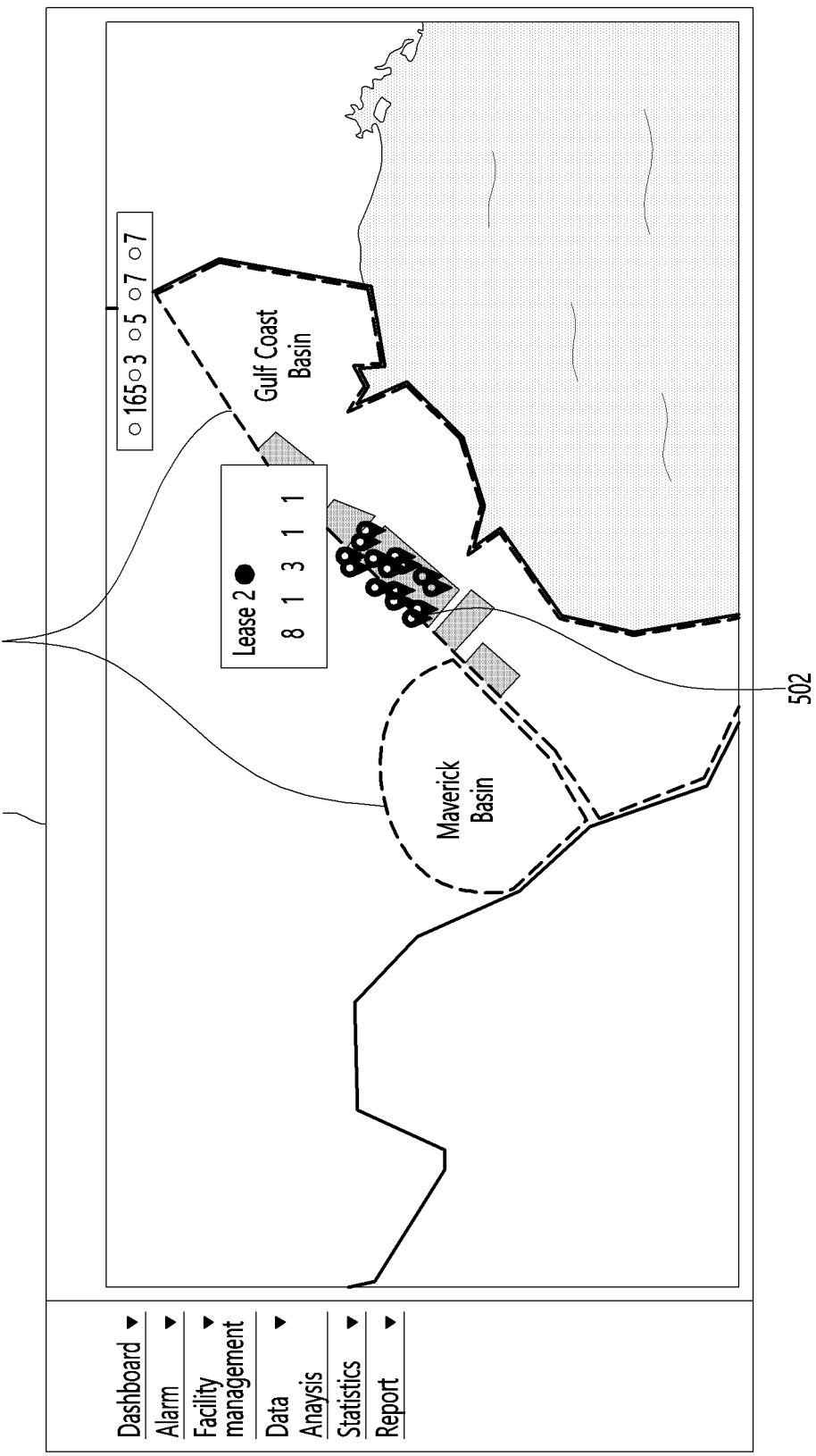
FIG. 7 is an example view of dashboard UI and section information according to an embodiment of the present disclosure.

Referring to FIG. 7, the dashboard UI 415 according to an embodiment of the present disclosure may display a plurality of oil drilling apparatuses 200 currently being monitored with preset section information 501 and flags 502 on a map application indicating locations of the plurality of oil drilling apparatuses 200 and provide the map application to the oil drilling apparatus 200 which receives a selection input through the user terminal among the plurality of oil drilling apparatuses 200.

In this case, the section information 501 may be displayed to include a corresponding administrative district in a line or dotted line shape that may identify a section on the map application.

The display of administrative district is an important element in oil field monitoring, and when an accident or reportable event occurs in an oil field, it is essential to first notify the administrative district where the oil field is located.

In addition, a plurality of oil fields displayed in the administrative district are displayed as the flags 502 distinguished by color, and when a selection input for one of the flags 502 is received, the flags 502 may be popped up and provided as identifiers that are distinguished by color on the degree of abnormality and whether a pump device, a motor device, an oil storage device, and an oil transfer device included in the oil drilling apparatus 200 are abnormal.

Meanwhile, as illustrated in FIG. 8, the dashboard UI 415 may provide a status summary card 503 for each of the plurality of oil drilling apparatuses 200 located in corresponding sections when preset section information 501 is selected and input by a user terminal.

The status summary card 503 according to an embodiment of the present disclosure may display an oil field identification number, a monitoring start date, an average operation time, and an average production as numbers, and may display abnormality for each of a motor operation, a stroke count, a chemical pump, an ESP/Jet pump, pressure, an oil/water mixture, temperature, and other issues as a distinguishable identifier and color.

Figure 9:
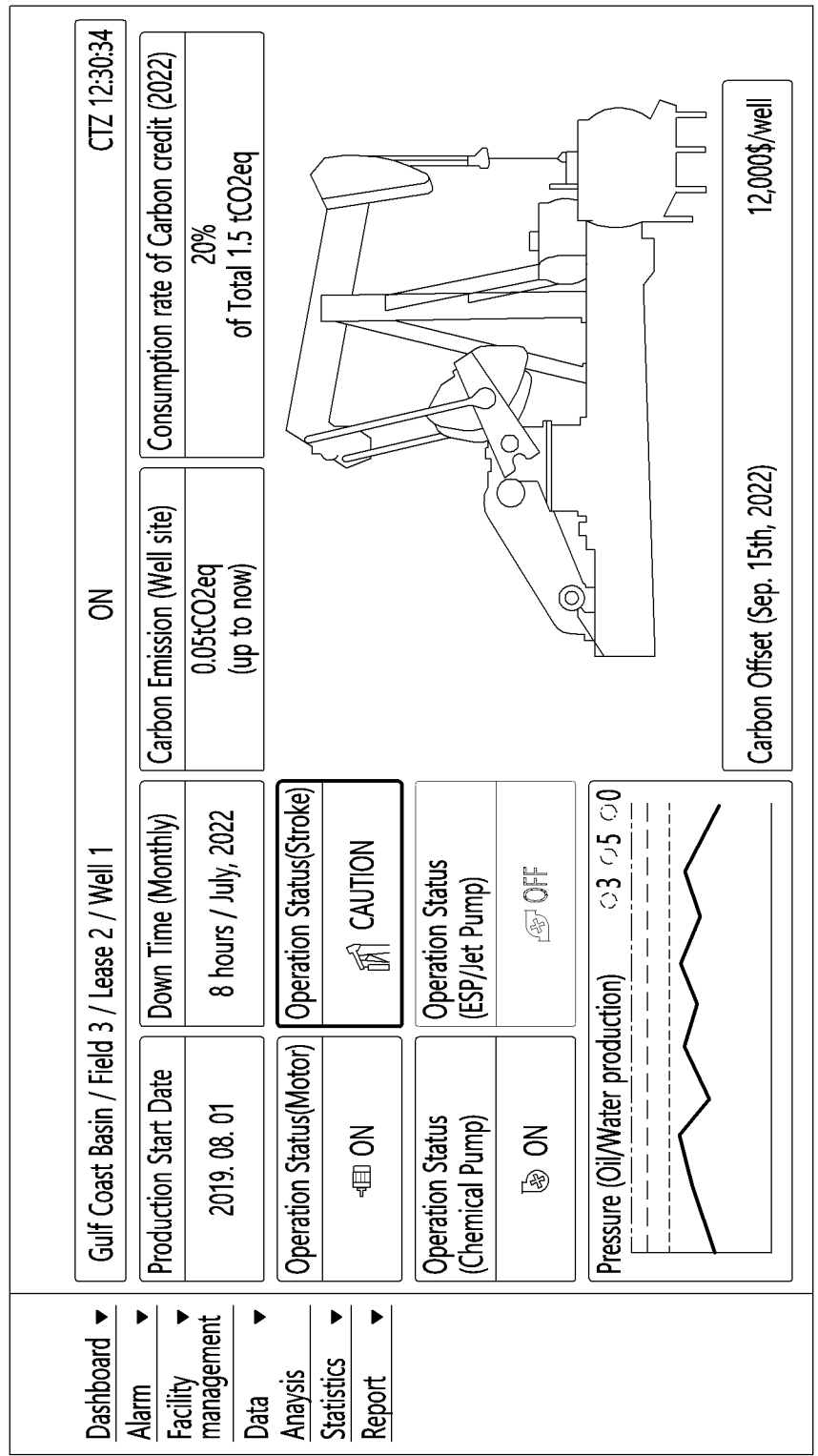
FIG. 9 is an example view of a detailed status UI according to an embodiment of the present disclosure.

When one of these status summary cards 503 is selected by a user terminal, the selected status summary card 503 may be enlarged as illustrated in FIG. 9 to provide detailed information on an oil field.

In this case, the detailed information of the oil field may include a plurality of identifiers and graphs, and as described above, as each identifier is closer to red in the graph, this may indicate that a problem occurs in the oil field or the oil drilling apparatus 200 in the oil field, and as each identifier is closer to green, this may indicate that the oil field or the oil drilling apparatus 200 in the oil field operates normally.

Figure 10:
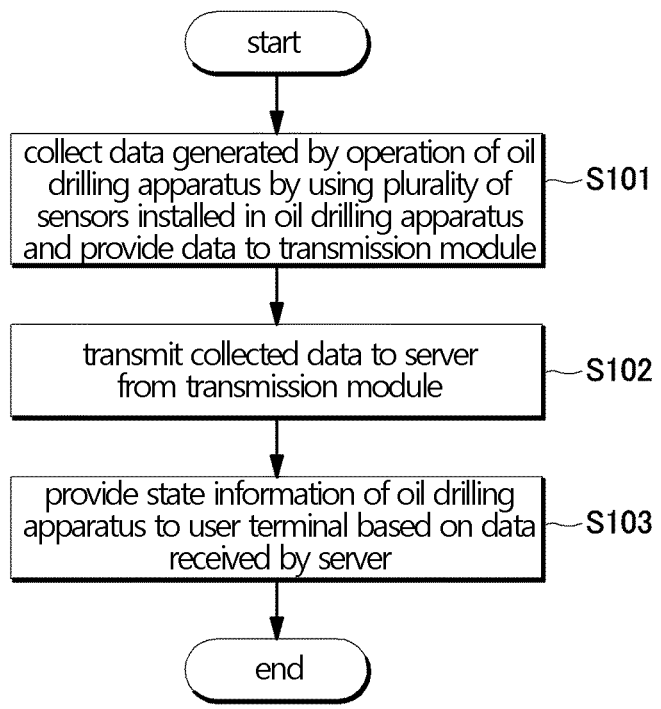
FIG. 10 is a flowchart of a sequence of performing an oil field monitoring service providing method according to an embodiment of the present disclosure.

A sequence of performing the oil field monitoring service providing method according to the embodiment of the present disclosure will be described with reference to FIG. 10.

First, the plurality of sensors 210 installed in the oil drilling apparatus 200 collect data generated as the oil drilling apparatus 200 operates and provide the data to the transmission module 300 (S101).

Next, the transmission module 300 transmits the collected data to the server 100 (S102).

Thereafter, the server 100 provides status information of the oil drilling apparatus 200 to a user terminal based on the received data (S103).

The present disclosure provides an oil field monitoring service providing method and oil field monitoring service providing system that analyze data monitored in real time and provide the analyzed data through various user interfaces (UIs) of a user terminal and to support a stable operation, and thus, costs required for resource development and production may be reduced to increase economic feasibility, and a stable management may be supported.

In addition, a data-based production improvement solution is provided to an oil field and an oil drilling apparatus having low production efficiency due to lack of systematic management, and a data compression and transmission cycle is automatically determined according to the importance of data, and thus, costs required during data transmission and reception may also be reduced.

One embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Although the method and system of the present disclosure are described with respect to specific embodiments, some or all of components or operations thereof may be implemented by using a computer system having a general-purpose hardware architecture.

The above descriptions of the present disclosure are for illustrative purposes only, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and similarly, components described in a distributed manner may also be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. An oil field monitoring service providing method comprising:
    collecting, by a plurality of sensors installed in an oil drilling apparatus, data generated as the oil drilling apparatus operates and providing the data to a transmission module;
    transmitting the collected data from the transmission module to a server; and
    providing status information of the oil drilling apparatus to a user terminal based on the collected data transmitted to the server,
    wherein the transmitting of the collected data includes:
    determining, by the transmission module, a transmission cycle according to a type of data to be transmitted and whether there is an increase in communication network usage fee used by the transmission module within a preset period; and
    compressing the data to be transmitted according to the transmission cycle determined by the transmission module and transmitting the compressed data to the server.

2. The oil field monitoring service providing method of claim 1, wherein the transmission module includes:
    a first transmission unit configured to receive the collected data in real time from the plurality of sensors respectively installed in respective components of the oil drilling apparatus, set a transmission cycle for each piece of data, and transmit data compressed by a second transmission unit to the server, and
    the second transmission unit configured to receive the collected data from the first transmission unit and compresses data collected during a period corresponding to the set transmission cycle for each piece of data.

3. The oil field monitoring service providing method of claim 2, wherein
    the first transmission unit classifies a plurality of pieces of received data, calculates an average value of the classified data, and provides the average value to the server at different cycles according to a type of the classified data and whether there is an increase in communication network usage fee within the preset period.

4. The oil field monitoring service providing method of claim 1, wherein,
    in the collecting of the data generated as the oil drilling apparatus operates, the plurality of sensors include a plurality of different types of sensors, are respectively installed in a pump device, a motor device, an oil storage device, and an oil transfer device included in the oil drilling apparatus, collect different types of data, and provide the different types of data to the transmission module.

5. The oil field monitoring service providing method of claim 1, wherein
    the transmitting of the collected data further includes calculating, by the server, a communication network usage fee required within the preset period based on an amount of data received by the server and a number of times of reception of data received from the transmission module in a process of transmitting the collected data from the transmission module to the server via a base station of a telecommunication company, and transmitting a signal indicating expansion of the transmission cycle to the transmission module when the calculated communication network usage fee is more than a preset threshold.

6. The oil field monitoring service providing method of claim 5, wherein,
in the transmitting of the collected data, communication between the plurality of sensors and the transmission module is performed through a local area network without using a base station.

7. The oil field monitoring service providing method of claim 5, wherein
the transmitting of the collected data further includes adjusting, by the transmission module, a transmission cycle for each piece of data after receiving the signal from the server.

8. The oil field monitoring service providing method of claim 7, wherein,
in the adjusting of the transmission cycle for each piece of data, the transmission module sets differently the transmission cycle for each piece of data depending on positions in which the plurality of sensors are installed.

9. The oil field monitoring service providing method of claim 7, wherein,
in the adjusting of the transmission cycle for each piece of data, a transmission cycle of data collected from a pump device and a motor device included in the oil drilling apparatus is less than a transmission cycle of data collected from an oil storage device and an oil transfer device.

10. The oil field monitoring service providing method of claim 7, wherein, in the adjusting of the transmission cycle for each piece of data,
the plurality of sensors include different types of sensors including at least two of a pressure sensor, a current sensor, a voltage sensor, a temperature sensor, a vibration sensor, and a sound detection sensor, and
the transmission module sets differently the transmission cycle for each piece of data depending on a type of data collected from the plurality of sensors.

11. The oil field monitoring service providing method of claim 1, wherein,
in the providing of the status information, an oil field monitoring user interface (UI) provides the status information of the oil drilling apparatus as a number and an identifier for each preset category, and
the oil field monitoring UI includes:
an oil field status UI configured to display an oil field identification number, a current temperature, a stroke count, and an oil storage amount of a tank on each of at least one oil drilling apparatus;
an alarm list UI configured to display whether there is abnormality in a pump device, a motor device, an oil storage device, and an oil transfer device included in the at least one oil drilling apparatus during the preset period or a period received from the user terminal, and a degree of the abnormality of the pump device, the motor device, the oil storage device, and the oil transfer device on each of the at least one oil drilling apparatus, through identifiers distinguished by color; and
a weather UI configured to provide weather information in a location of an oil field where a corresponding oil drilling apparatus is installed to each of the at least one oil drilling apparatus.

12. The oil field monitoring service providing method of claim 11, wherein
the oil field monitoring UI further includes a dashboard UI,
the dashboard UI displays, by the server, a plurality of oil drilling apparatuses currently being monitored with preset section information and a flag on a map application indicating locations of the plurality of oil drilling apparatuses and provide the map application to an oil drilling apparatus of the plurality of oil drilling apparatuses which receives a selection input through the user terminal among the plurality of oil drilling apparatuses, and
the flag provides whether there is abnormality in a pump device, a motor device, an oil storage device, and an oil transfer device included in the oil drilling apparatus of the plurality of oil drilling apparatuses which receives the selection input and the degree of abnormality together with the identifier distinguished by color on the oil drilling apparatus of the plurality of oil drilling apparatuses which receives the selection input.

13. The oil field monitoring service providing method of claim 12, wherein
the dashboard UI provides a status summary card for each of the plurality of oil drilling apparatuses currently being monitored with the preset section information and located in a corresponding section when the preset section information for the plurality of oil drilling apparatuses currently being monitored is selected and input by the user terminal, and
the status summary card displays an oil field identification number, a monitoring start date, an average operation time, and an average production as numbers, and displays abnormality for each of a motor operation, a stroke count, a chemical pump, an ESP/Jet pump, pressure, an oil/water mixture, temperature, and other issues as a distinguishable identifier and color.

14. An oil field monitoring service providing system comprising:
a plurality of sensors installed in an oil drilling apparatus to collect data generated as the oil drilling apparatus operates and to provide the data to a transmission module;
the transmission module configured to determine a transmission cycle according to whether there is an increase in communication network usage fee used by the transmission module within a preset period and a type of data to be transmitted, and configured to compress data according to the determined transmission cycle and transmit the compressed data to a server; and
a server including a memory that stores a program for performing an oil field monitoring service providing method and a processor that executes the program and configured to provide status information of the oil drilling apparatus to a user terminal based on the data received from the transmission module.

\* \* \* \* \*